US012602864B2

(12) United States Patent
Papadopoulos et al.

(10) Patent No.: US 12,602,864 B2
(45) Date of Patent: Apr. 14, 2026

(54) EVENT ROUTING IN 3D GRAPHICAL ENVIRONMENTS

(71) Applicant: APPLE INC., Cupertino, CA (US)

(72) Inventors: Charilaos Papadopoulos, Redwood City, CA (US); Aaron M. Burns, Sunnyvale, CA (US); Alexis H. Palangie, Palo Alto, CA (US); Andrew P. Richardson, San Francisco, CA (US); Bruno M. Sommer, Sunnyvale, CA (US); Charles Magahern, San Francisco, CA (US); Joseph P. Cerra, San Francisco, CA (US); Justin T. Voss, San Jose, CA (US); Luis R. Deliz Centeno, Fremont, CA (US); Mark A. Ebbole, San Francisco, CA (US); Martin Garstenauer, Ternberg (AT); Peter L. Hajas, Lafayette, CO (US); Samuel L. Iglesias, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 147 days.

(21) Appl. No.: 18/083,474

(22) Filed: Dec. 17, 2022

(65) Prior Publication Data

US 2023/0298267 A1    Sep. 21, 2023

Related U.S. Application Data

(63) Continuation of application No. PCT/US2021/037340, filed on Jun. 15, 2021.
(Continued)

(51) Int. Cl.
*G06T 17/00* (2006.01)
*G06F 3/01* (2006.01)

(52) U.S. Cl.
CPC .............. *G06T 17/00* (2013.01); *G06F 3/013* (2013.01); *G06F 3/017* (2013.01)

(58) Field of Classification Search
None
See application file for complete search history.

(56) References Cited

U.S. PATENT DOCUMENTS 6,670,969 B1    12/2003    Halstead, Jr. et al.
8,334,842 B2    12/2012    Markovic et al.
(Continued)

FOREIGN PATENT DOCUMENTS

CN        106575153 A        4/2017
CN        108369345 A        8/2018
(Continued)

OTHER PUBLICATIONS (PCT) International Search Report and Written Opinion of the International Searching Authority, International Application No. PCT/US2021/037340, 13 pages, Sep. 30, 2021.
(Continued)

*Primary Examiner* — Hilina K Demeter
(74) *Attorney, Agent, or Firm* — Thompson Hine LLP

(57) ABSTRACT

Various implementations disclosed herein more accurately or efficiently determine to which of multiple potential virtual objects user input should be directed in a 3D graphical environment. In some implementations, this involves using a rule that accounts for the types of the virtual objects to which a particular event may correspond. For example, a direction of intent may be identified and a rule used to determine to which of multiple potential virtual objects to associate an event.

24 Claims, 8 Drawing Sheets

Related U.S. Application Data

(60) Provisional application No. 63/042,128, filed on Jun. 22, 2020.

(56) References Cited

U.S. PATENT DOCUMENTS

| | | | |
|---|---|---|---|
| 8,777,746 B2 | 7/2014 | Watkins, Jr. et al. | |
| 9,213,405 B2 | 12/2015 | Perez et al. | |
| 9,996,155 B2 | 6/2018 | Mullins | |
| 10,510,190 B2 | 12/2019 | Scavezze et al. | |
| 2003/0098881 A1* | 5/2003 | Nolte | G06F 3/0481 |
| | | | 715/764 |
| 2013/0241805 A1 | 9/2013 | Gomez | |
| 2016/0026242 A1 | 1/2016 | Burns et al. | |
| 2016/0321841 A1* | 11/2016 | Christen | G02B 27/017 |
| 2017/0109936 A1 | 4/2017 | Powderly et al. | |
| 2017/0228921 A1* | 8/2017 | Buhlmann | G06F 3/04842 |
| 2017/0329419 A1* | 11/2017 | Dearman | G06F 3/0346 |
| 2017/0337742 A1 | 11/2017 | Powderly et al. | |
| 2017/0372499 A1* | 12/2017 | Lalonde | G06T 19/006 |
| 2018/0059777 A1* | 3/2018 | Kobayashi | G06F 3/038 |
| 2018/0150204 A1* | 5/2018 | Macgillivray | G06F 3/04815 |
| 2018/0300952 A1* | 10/2018 | Evans | G06F 9/453 |
| 2018/0348861 A1* | 12/2018 | Uscinski | A63F 13/211 |
| 2019/0188910 A1* | 6/2019 | Duca | G06T 19/20 |
| 2019/0391726 A1 | 12/2019 | Iskandar et al. | |
| 2020/0241629 A1* | 7/2020 | Germer | G06F 3/0304 |
| 2021/0019036 A1* | 1/2021 | Wang | G06F 3/0346 |

FOREIGN PATENT DOCUMENTS

| | | |
|---|---|---|
| CN | 108604120 A | 9/2018 |
| CN | 109496331 A | 3/2019 |
| CN | 109891368 A | 6/2019 |
| WO | 2017/196395 A1 | 11/2017 |

OTHER PUBLICATIONS

China National Intellectual Property Administration, First Office Action and Search Report issued in Chinese Patent Application No. 202480051479.X dated Jan. 21, 2026 with English translation (24 pages).

* cited by examiner

Device 110

Device 120

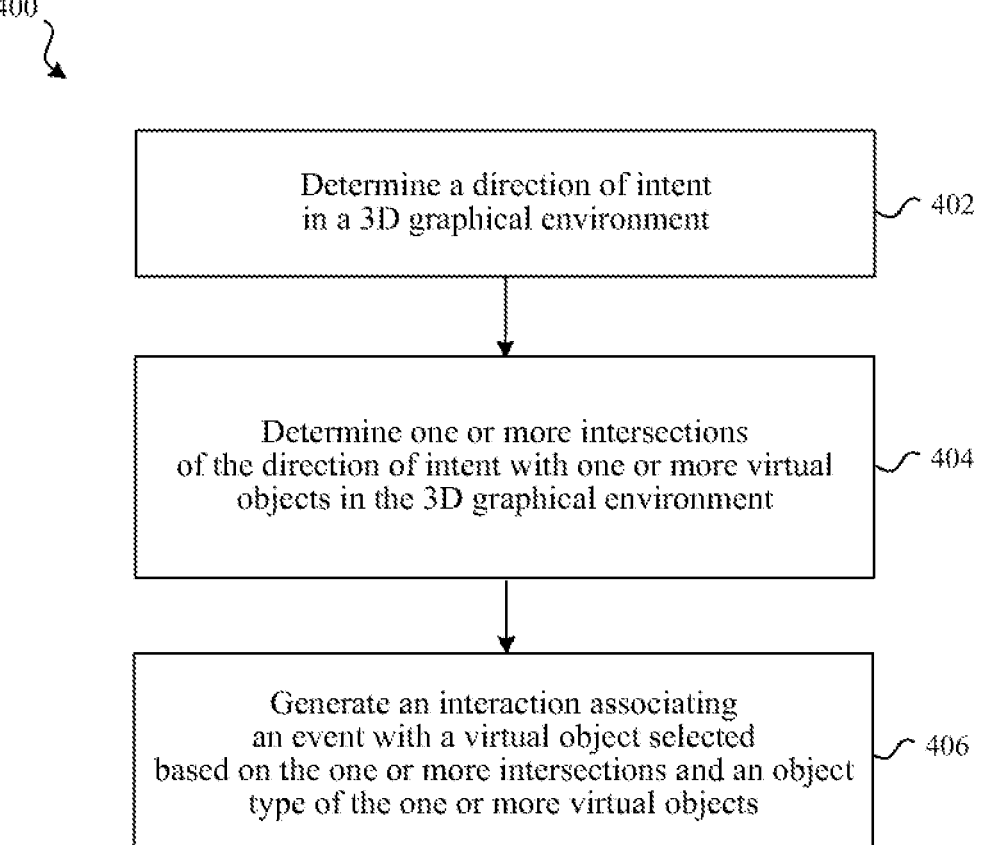

400

Determine a direction of intent
in a 3D graphical environment ⟋ 402

Determine one or more intersections
of the direction of intent with one or more virtual
objects in the 3D graphical environment ⟋ 404

Generate an interaction associating
an event with a virtual object selected
based on the one or more intersections and an object
type of the one or more virtual objects ⟋ 406

EVENT ROUTING IN 3D GRAPHICAL ENVIRONMENTS

CROSS-REFERENCE TO RELATED APPLICATIONS

This patent application is a continuation of International Application No. PCT/US2021/037340 filed Jun. 15, 2021, which claims the benefit of U.S. Provisional Application No. 63/042,128 filed on Jun. 22, 2020, entitled "EVENT ROUTING IN 3D GRAPHICAL ENVIRONMENTS," each of which is incorporated herein by this reference in its entirety.

TECHNICAL FIELD

The present disclosure generally relates to user actions and other events that occur in three-dimensional (3D) graphical environments, and in particular, to systems, methods, and devices that detect, recognize, and propagate events in such environments.

BACKGROUND

Computer systems and methods used to present 3D graphical environments to users provide various mechanisms for users to provide input or otherwise initiate events. Such systems and methods may not adequately facilitate user action directed at virtual content, such as virtual content that is outside of arms reach from the user. For example, such systems and methods may not accurately or efficiently determine to which of multiple potential virtual objects (e.g., list containers, list elements, button containers, buttons, etc.) a user action should be directed in a 3D graphical environment.

SUMMARY

Various implementations disclosed herein include devices, systems, and methods that more accurately or efficiently determine to which of multiple potential virtual objects a user action should be directed in a 3D graphical environment. In some implementations, an event and a direction of intent may be identified and a rule used to determine to which of multiple potential virtual objects to associate the event. Examples of an event include, but are not limited to, a user providing a tactile, audible, or other command, e.g., saying "select," making a hand gesture, tapping an input mechanism on a device, etc. Examples of sources of a direction of intent include, but are not limited to, a user's gaze direction, a direction the user is pointing a finger, a direction the user is pointing a hand, the direction the user is pointing a device, etc.

In some implementations, a rule is used to determine to which virtual object(s) to associate an event. Such a rule may utilize object information, such as whether an object has a first type (e.g., a "strong" object) or a second type (e.g., a "weak" object). Types such as "weak" and "strong" may be used to distinguish between types of virtual objects that are used differently, e.g., invisible containers may be labelled "weak" objects while opaque button may be labelled "strong." Such a rule may additionally or alternatively utilize information about the proximity of candidate virtual objects. For example, the rule may account for which object(s) is/are closest to the device providing the 3D graphical environment and/or which objects are closest to the eye/hand/device/etc. that is the source of a direction of intent. In some implementations, such a rule assesses the proximity of virtual objects in the direction of intent, e.g., along a ray cast in the direction of intent. In some implementations, the rule accounts for whether intersections with virtual objects involve such a ray entering into or existing from the virtual objects.

Some implementations use a processor of an electronic device to implement a method, for example, by executing code stored on a non-transitory computer-readable storage medium to perform the method. The method may involve determining a direction of intent in a 3D graphical environment, where the direction of intent is associated with an event. The direction of intent may be limited to a particular line segment along the direction of intent so that it does not correspond to positions in the 3D graphical environment that are not intended. For example, the convergence of eye directions of a user's eyes may be used to determine that whatever virtual object(s) the user intends to interact with are objects that the user's eyes could be looking at given the convergence of the user's eye directions. A direction of intent need not coincide in time with the event. For example, the direction of intent may be determined based on a time period or history, e.g., where the user has looked over the last 2 seconds. In some implementations, the event is a spoken word, hand gesture, input-device input, etc. that indicates a desire to interact with a virtual object in the direction of intent.

The method may involve determining one or more intersections of the direction of intent with one or more virtual objects in the 3D graphical environment. In some implementations, intersections are determined by casting a ray based on the direction of intent. The intersections may be determined based on the ray contacting an object, for example, at entry and exit points.

The method may involve generating an interaction (e.g., a "hit") associating the event with a virtual object, for example, by selecting the virtual object based on the one or more intersections and an object type of the one or more virtual objects. In some implementations, the interaction is generated based on a rule that accounts for the types of the virtual objects to which a particular event may correspond. Such a rule may utilize object information, such as whether an object has a first type (e.g., a "strong" object) or a second type (e.g., a "weak" object). Such a rule may utilize proximity of virtual objects. In some implementations, such a rule assesses the proximity of virtual objects in the direction of intent, e.g., along a ray cast in the direction of intent. In some implementations, the rule accounts for whether intersections with virtual objects involve such a ray entering into or existing from the virtual objects. One exemplary rule selects the virtual object with the nearest "strong" entry point along a ray cast in the direction of intent and, if no virtual objects do so, selects the virtual object with the nearest "weak" exit point along the ray cast in the direction of intent. Another exemplary rule selects the virtual object with the nearest "strong" entry point or "weak" exit point, whichever comes first along a ray cast in the direction of intent.

Some implementations propagate events to one or more virtual objects based on determining an interaction that associates the event with the virtual object(s). In some implementations, this involves determining a relationship between the virtual object and a second virtual object based on an object hierarchy. For example, such a hierarchy may indicate the second virtual object is contained with the first virtual object. In one example, based on determining such a relationship, an event directed to or otherwise associated with the first virtual object may be propagated to the second virtual object. As a specific example, a swipe type event received by a button object within a button container object may be propagated to the button container object based on the button object being contained within the button container object and/or based upon other considerations, e.g., a current state/situation or other context present in the 3D graphical environment, the features of the objects, the types of input the objects receive, programmer-specified parameters, etc. Events of a first type (e.g., "swipe" type events) may be propagated to parents while events of a second type (e.g., "click" type events) may not be propagated to parents based on type-specific propagation rules.

In some implementations, there is uncertainty about which of multiple virtual objects an event should be routed. In some implementations, an event may be associated with each of the multiple virtual objects simultaneously. In some implementations, an event dispatcher may associate an event with each of multiple virtual objects in a sequence or prioritized order, where each virtual object, upon receiving the event, determines whether it can and will handle the event and responds back to an event dispatcher with an acknowledgement or refusal of the event.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4 is a flowchart representation of an exemplary method for routing an event in accordance with some implementations.

Figure 1:
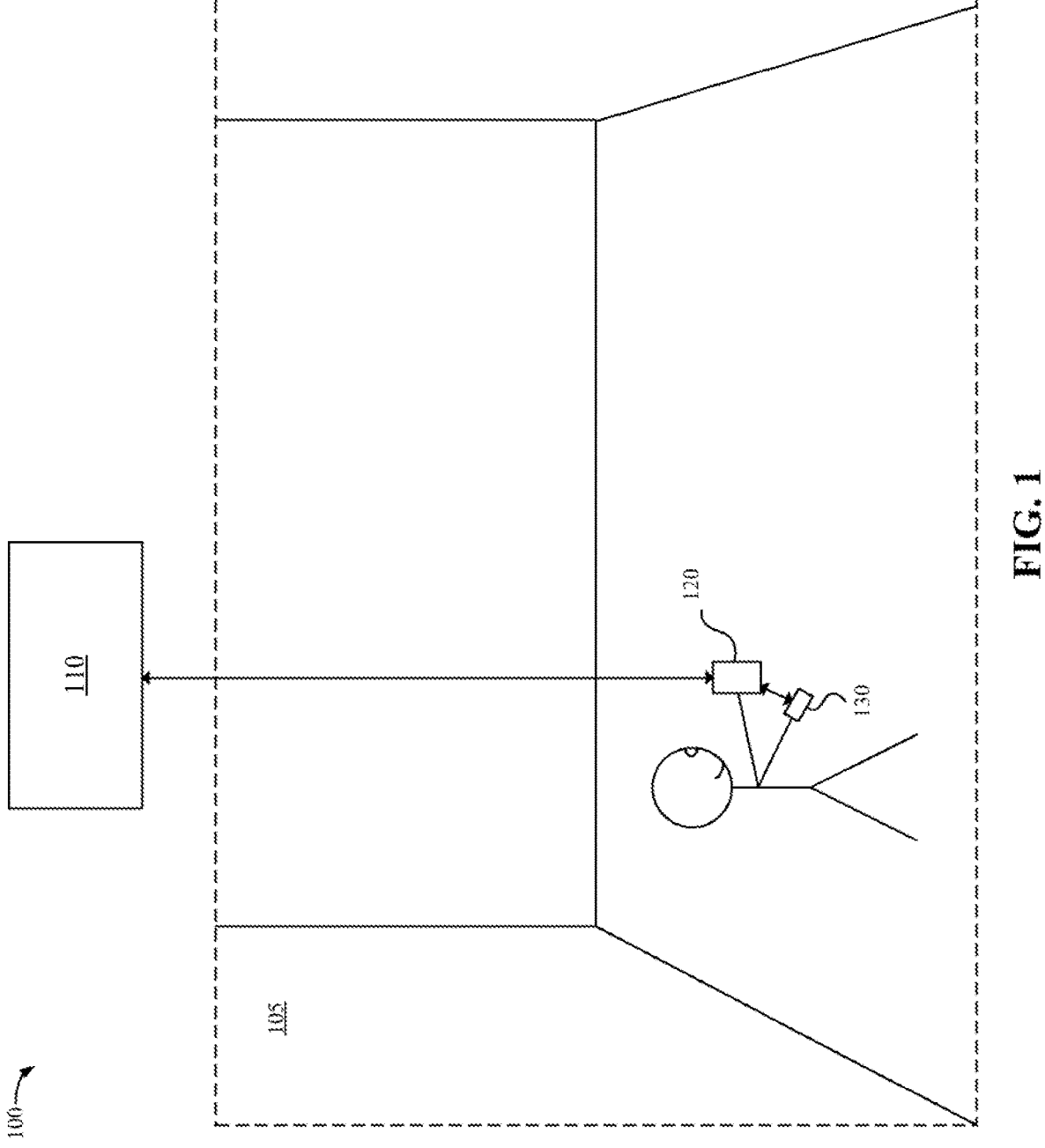
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 is a block diagram of an example operating environment 100 in accordance with some implementations. In this example, the example operating environment 100 illustrates an example physical environment 105. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a server 110, a device 120, and a pointing device 130. In an exemplary implementation, the operating environment 100 does not include a server 110 and/or a pointing device 130, and the methods described herein are performed on the device 120.

In some implementations, the server 110 is configured to manage and coordinate an experience for the user. In some implementations, the server 110 includes a suitable combination of software, firmware, and/or hardware. The server 110 is described in greater detail below with respect to FIG. 2. In some implementations, the server 110 is a computing device that is local or remote relative to the physical environment 105. In one example, the server 110 is a local server located within the physical environment 105. In another example, the server 110 is a remote server located outside of the physical environment 105 (e.g., a cloud server, central server, etc.). In some implementations, the server 110 is communicatively coupled with the device 120 via one or more wired or wireless communication channels (e.g., BLUETOOTH, IEEE 802.11x, IEEE 802.16x, IEEE 802.3x, etc.).

In some implementations, the device 120 is configured to present an environment to the user. In some implementations, the device 120 includes a suitable combination of software, firmware, and/or hardware. The device 120 is described in greater detail below with respect to FIG. 3. In some implementations, the functionalities of the server 110 are provided by and/or combined with the device 120. In some implementations, the device 120 communicates with the pointing device 130 to receive input, for example, providing a direction of intent and/or initiating a user event. In some implementations, the device 120 additionally or alternatively itself receives input or uses sensors to detect the user or aspects of the environment that provide input, for example, providing a direction of intent and/or initiating a user event.

According to some implementations, the device 120 presents an extended reality (XR) environment to the user. An extended reality (XR) environment refers to a wholly or partially simulated environment that someone may interact with and/or sense using an electronic device. For example, an XR environment may include virtual reality (VR) content, augmented reality (AR) content, mixed reality (MR) content, or the like. Using an XR system, a portion of a person's physical motions, or representations thereof, may be tracked. In response, one or more characteristics of a virtual object simulated in the XR environment may be adjusted such that it adheres to one or more laws of physics. For example, the XR system may detect a user's movement and, in response, adjust graphical and auditory content presented to the user in a way similar to how views and sounds would change in a physical environment. In another example, the XR system may detect movement of an electronic device presenting an XR environment (e.g., a laptop, a mobile phone, a tablet, or the like) and, in response, adjust graphical and auditory content presented to the user in a way similar to how views and sounds would change in a physical environment. In some situations, the XR system may adjust one or more characteristics of graphical content in the XR environment responsive to a representation of a physical motion (e.g., a vocal command).

Various electronic systems enable one to interact with and/or sense XR environments. For example, projection-based systems, head-mountable systems, heads-up displays (HUDs), windows having integrated displays, vehicle windshields having integrated displays, displays designed to be placed on a user's eyes (e.g., similar to contact lenses), speaker arrays, headphones/earphones, input systems (e.g., wearable or handheld controllers with or without haptic feedback), tablets, smartphones, and desktop/laptop computers may be used. A head-mountable system may include an integrated opaque display and one or more speakers. In other examples, a head-mountable system may accept an external device having an opaque display (e.g., a smartphone). The head-mountable system may include one or more image sensors and/or one or more microphones to capture images or video and/or audio of the physical environment. In other examples, a head-mountable system may include a transparent or translucent display. A medium through which light representative of images is directed may be included within the transparent or translucent display. The display may utilize OLEDs, LEDs, uLEDs, digital light projection, laser scanning light source, liquid crystal on silicon, or any combination of these technologies. The medium may be a hologram medium, an optical combiner, an optical waveguide, an optical reflector, or a combination thereof. In some examples, the transparent or translucent display may be configured to selectively become opaque.

Projection-based systems may use retinal projection technology to project graphical images onto a user's retina. Projection systems may also be configured to project virtual objects into the physical environment, for example, on a physical surface or as a hologram.

In some implementations, the device 120 is a handheld electronic device (e.g., a smartphone or a tablet) configured to present content to the user. In some implementations, the user wears the device 120 on his/her head. As such, the device 120 may include one or more displays provided to display content. For example, the device 120 may enclose the field-of-view of the user. In some implementations, the device 120 is replaced with a chamber, enclosure, or room configured to present content in which the user does not wear or hold the device 120.

Figure 2:
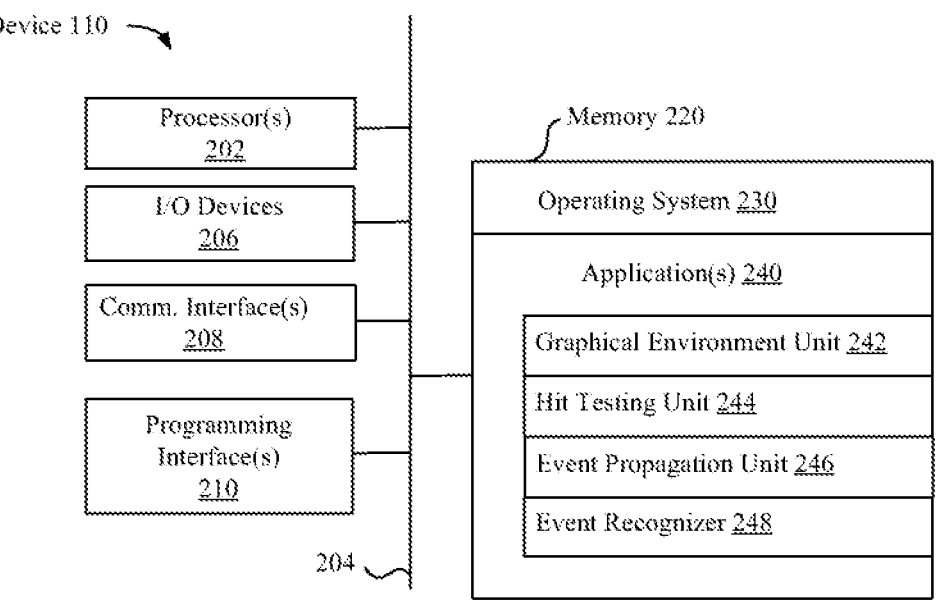
FIG. 2 is a block diagram of an example server in accordance with some implementations.

FIG. 2 is a block diagram of an example of the server 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the server 110 includes one or more processors 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processors 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and one or more applications 240.

The operating system 230 includes procedures for handling various basic system services and for performing hardware dependent tasks. In some implementations, the applications 240 are configured to manage and coordinate one or more experiences for one or more users (e.g., a single experience for one or more users, or multiple experiences for respective groups of one or more users).

The applications 240 include a graphical environment unit 242, a hit test unit 244, an event propagation unit 246, and an event recognizer unit 248. These can be combined into a single application or unit or separated into one or more additional applications or units.

The graphical environment unit 242 may be configured to provide a XR environment or any other graphical 3D environment, for example, by generating views of an environment based on the position and/or movement of a device upon which the views of the environment will be displayed. The graphical environment unit 242 may maintain a 3D representation of real and virtual objects including, for example, data representing the positions and attributes of such objects.

The hit testing unit 244 may be configured to route an event to one or more virtual objects, for example, by associating the event with the one or more virtual objects. The hit testing unit 244 may be configured to identify an object that the user intends to interact with, e.g., identifying the "deepest" element with which the user is interacting.

The event propagation unit 246 may be configured to propagate events to one or more virtual objects, for example, propagating an event from a virtual object to its parent, etc. The event propagation unit 246 may be configured to forward events across a user interface object hierarchy. The event propagation unit 246 may be configured to handle interactions at higher level objects or containers. The event propagation unit 246 may reduce the need for code duplication within objects.

The event recognizer 248 may be configured to handle interactions on behalf of virtual objects (e.g., user interface elements). The event recognizer 248 may facilitate code generalization and reuse, e.g., providing a user interface gesture recognition unit at the operating system level rather than at the application level or object level.

Although these units are shown as residing on a single device (e.g., the server 110), it should be understood that in other implementations, any combination of the elements may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
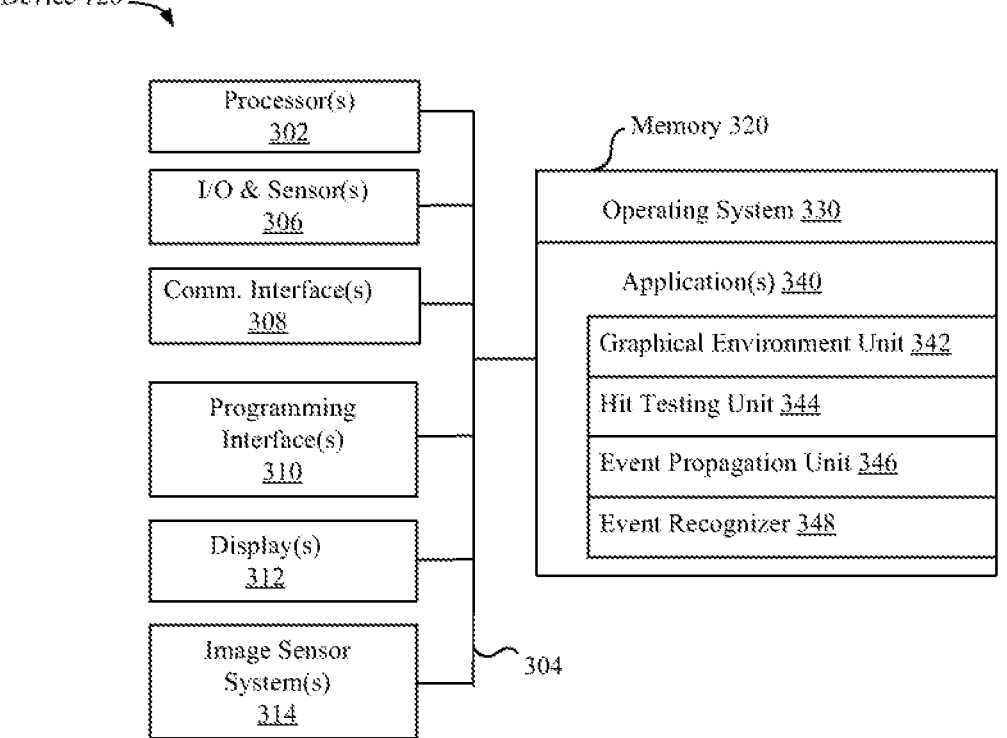
FIG. 3 is a block diagram of an example device in accordance with some implementations.

FIG. 3 is a block diagram of an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processors 302 (e.g., microprocessors, ASICs, FPGAs, GPUs, CPUs, processing cores, and/or the like), one or more input/output (I/O) devices and sensors 306, one or more communication interfaces 308 (e.g., USB, FIRE-WIRE, THUNDERBOLT, IEEE 802.3x, IEEE 802.11x, IEEE 802.16x, GSM, CDMA, TDMA, GPS, IR, BLU-ETOOTH, ZIGBEE, SPI, I2C, and/or the like type interface), one or more programming (e.g., I/O) interfaces 310, one or more displays 312, one or more sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 312 are configured to present the experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 312 correspond to diffractive, reflective, polarized, holographic, etc. wave-guide displays. For example, the device 120 includes a single display. In another example, the device 120 includes a display for each eye of the user.

In some implementations, the one or more sensor systems 314 are configured to obtain sensor data that corresponds to at least a portion of the physical environment 105. For example, the one or more sensor systems 314 include one or more RGB cameras (e.g., with a complimentary metal-oxide-semiconductor (CMOS) image sensor or a charge-coupled device (CCD) image sensor), monochrome cameras, IR cameras, event-based cameras, and/or the like. In various implementations, the one or more sensor systems 314 further include illumination sources that emit light, such as a flash. In various implementations, the one or more sensor systems 314 further include an on-camera image signal processor (ISP) configured to execute a plurality of processing operations on the image data including at least a portion of the processes and techniques described herein.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processors 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and one or more applications 340.

The operating system 330 includes procedures for handling various basic system services and for performing hardware dependent tasks. In some implementations, the applications 340 are configured to manage and coordinate one or more experiences for one or more users (e.g., a single experience for one or more users, or multiple experiences for respective groups of one or more users).

The applications 340 include a graphical environment unit 342, a hit test unit 344, an event propagation unit 346, and an event recognizer unit 348. These can be combined into a single application or unit or separated into one or more additional applications or units.

The graphical environment unit 342 may be configured to provide an XR environment or any other graphical 3D environment, for example, by generating views of an environment based on the position and/or movement of a device upon which the views of the environment will be displayed. The graphical environment unit 342 may maintain a 3D representation of real and virtual objects including, for example, data representing the positions and attributes of such objects.

The hit testing unit 344 may be configured to route an event to one or more virtual objects, for example, by associating the event with the one or more virtual objects. The hit testing unit 344 may be configured to identify an object that the user intends to interact with, e.g., identifying the "deepest" element with which the user is interacting.

The event propagation unit 346 may be configured to propagate events to one or more virtual objects, for example, propagating an event from a virtual object to its parent, etc. The event propagation unit 346 may be configured to forward events across a user interface object hierarchy. The event propagation unit 346 may be configured to handle interactions at higher level objects or containers. The event propagation unit 346 may reduce the need for code duplication within objects.

The event recognizer 348 may be configured to handle interactions on behalf of virtual objects (e.g., user interface elements). The event recognizer 348 may facilitate code generalization and reuse, e.g., providing a user interface gesture recognition unit at the operating system level rather than at the application level or object level.

Although these elements are shown as residing on a single device (e.g., the device 120), it should be understood that in other implementations, any combination of the elements may be located in separate computing devices. Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules (e.g., applications 340) shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 4 is a flowchart representation of an exemplary method for routing an event. In some implementations, the method 400 is performed on a device (e.g., server 110 or device 120 of FIGS. 1-3), such as a mobile device, desktop, laptop, HMD, or server device. The method 400 may be performed by a device (e.g., device 120 of FIGS. 1 and 3) that has a screen for displaying images and/or a screen for viewing stereoscopic images. In some implementations, the method 400 is performed on processing logic, including hardware, firmware, software, or a combination thereof. In some implementations, the method 400 is performed on a processor executing code stored in a non-transitory computer-readable medium (e.g., a memory).

At block 402, the method 400 determines a direction of intent in a 3D graphical environment. The direction of intent may be determined by determining a gaze direction of a user in the 3D graphical environment. The direction of intent may be determined by identifying a hand configuration and orientation, e.g., a hand with one finger extended in a pointing gesture, and determining a direction corresponding to the direction of a portion of the hand, e.g., the direction of the extended finger. In another example, the direction may be determined by identifying a device configuration and orientation, e.g., a mobile device such as device 130 in FIG. 1.

The direction of intent may be limited to a particular line segment along the direction of intent so that it does not correspond to positions in the 3D graphical environment that are not intended. For example, the convergence of eye directions of a user's eyes may be used to determine that whatever virtual object(s) the user intends to interact with are at least an identified distance away from the user.

The direction of intent is associated with an event, e.g., a user-initiated event. A direction of intent need not coincide in time with the event with which it is associated. For example, the direction of intent may be determined based on a time period or history, e.g., an average direction where the user has looked over the last 5 seconds leading up to an event. In some implementations, the event is a spoken word, hand gesture, input-device input, etc. that indicates a desire to interact with an object in the direction of intent.

In some implementations, a direction of intent is identified and represented graphically in the 3D graphical environment, for example, by displaying a line, arrow, cone, dot, circle, target symbol, highlighting, or other graphical indicator to graphically represent the direction of intent. The type of representation may depend upon the viewpoint. For example, if the direction of intent corresponds to a finger or hand-held device direction and is being represented from a side viewpoint, a line, arrow, or cone indicator may provide a good indication. In another example, if the direction of intent corresponds to a gaze direction and is being represented from a viewpoint along or near the direction of intent, a dot, circle, target symbol, or highlighting identifying content along or near the direction of intent may provide a good indication. In some implementation, the direction of intent is not graphically indicated.

At block 404, the method 400 determines one or more intersections of the direction of intent with one or more virtual objects in the 3D graphical environment. In some implementations, intersections are determined by casting a ray based on the direction of intent. The intersections may be determined based on the ray contacting an object, for example, at entry and exit points. Other implementations utilize alternative methods of aggregating intersections along a direction of intent. For example, rather than a ray, another shape such as a cone may be used, e.g., as a cone cast, aggregating all objects that intersect or are fully contained within the cone projected along the direction of intent.

At block 406, the method 400 generates an interaction (e.g., a "hit") associating the event with a virtual object, for example, by selecting the virtual object based on the one or more intersections and an object type of the one or more virtual objects. In some implementations, the interaction is generated based on a rule that accounts for the types of the virtual objects to which a particular event may correspond. Such a rule may utilize object information, such as whether an object has a first type (e.g., a "strong" object) or a second type (e.g., a "weak" object). Such a rule may utilize proximity of virtual objects. In some implementations, such a rule assesses the proximity of virtual objects in the direction of intent, e.g., along a ray cast in the direction of intent. In some implementations, the rule accounts for whether intersections with virtual objects involve such a ray entering into or existing from the virtual objects. One exemplary rule selects the virtual object with the nearest "strong" entry point along a ray cast in the direction of intent and, if no virtual objects do so, selects the virtual object with the nearest "weak" exit point along the ray cast in the direction of intent. Another exemplary rule selects the virtual object with the nearest "strong" entry point or "weak" exit point, whichever comes first along a ray cast in the direction of intent.

Some implementations propagate events to one or more virtual objects based on determining an interaction that associates the event with the virtual object(s). In some implementations, this involves determining a relationship between the virtual object and a second virtual object based on an object hierarchy. For example, such a hierarchy may indicate the second virtual object is contained with the first virtual object. In one example, based on determining such a relationship, an event directed to or otherwise associated with the first virtual object may be propagated to the second virtual object. As a specific example, a swipe type event received by a button object within a button container object may be propagated to the button container object based on the button object being contained within the button container object and/or based upon other considerations, e.g., a current state/situation or other context present in the 3D graphical environment, the features of the objects, the types of input the objects receive, programmer-specified parameters, etc. Events of a first type (e.g., "swipe" type events) may be propagated to parents while events of a second type (e.g., "click" type events) may not be propagated to parents based on type-specific propagation rules. In some implementations both event type and object hierarchy may be used to determine event propagation. Additionally, hierarchical propagation filtering can apply in both directions (parent to child, child to parent).

In some implementations, there is uncertainty about to which of multiple virtual objects to route an event. In some implementations, an event may be associated with each of the multiple virtual objects simultaneously. In some implementations, an event dispatcher may associate an event with each of multiple virtual objects in a sequence or prioritized order, where each virtual object, upon receiving the event, determines whether it can and will handle the event and responds back to an event dispatcher with an acknowledgement or refusal of the event.

Figure 5:
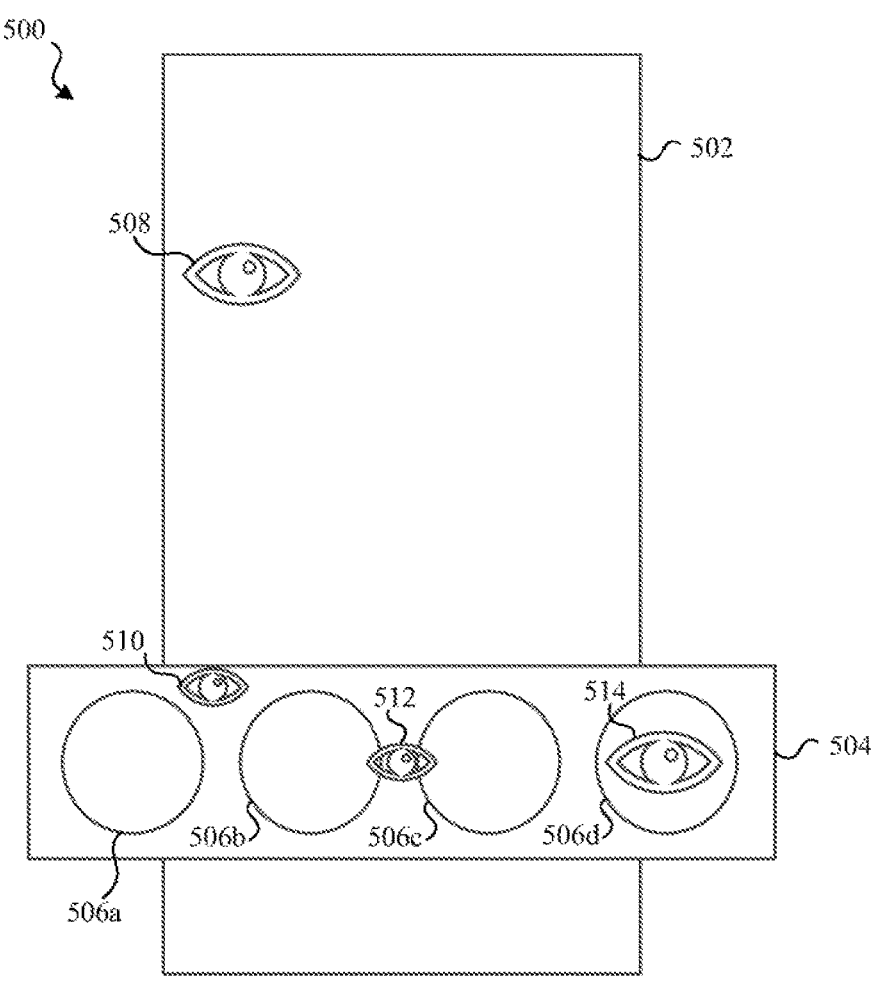
FIG. 5 is a block diagram illustrating multiple virtual objects that overlap one another from a viewpoint in graphical 3D environment.

FIG. 5 is a block diagram illustrating a two-dimensional (2D) depiction of multiple virtual objects that overlap one another from a viewpoint in graphical 3D environment. In this example, the multiple virtual objects include a vertically-scrollable chat transcript object 502, a horizontally-scrollable chat selector object 504 containing tap-able avatar objects 506a-d configured to enable a user to make selections to switch chats. In this example, the horizontally-scrollable chat selector object 504 is transparent. Implementations disclosed herein, facilitate appropriate routing of events that are associated with various directions of intent. For example, a vertical swipe gesture received while the user is directing intent in the direction of position 508 may be associated with the vertically-scrollable chat transcript object 502. A horizontal swipe gesture while the user is directing intent in the direction of positions 510, 512 may be associated with the horizontally-scrollable chat selector object 504. A tap input while the user is directing intent in the direction of position 514 may be associated with the tap-able avatar object 506d. In contrast, a horizontal swipe gesture, while the user is directing intent in the direction of position 514 may be associated with the tap-able avatar object 506d and then propagated to horizontally-scrollable chat selector object 504, for example, based on the type of the input.

Figure 6:
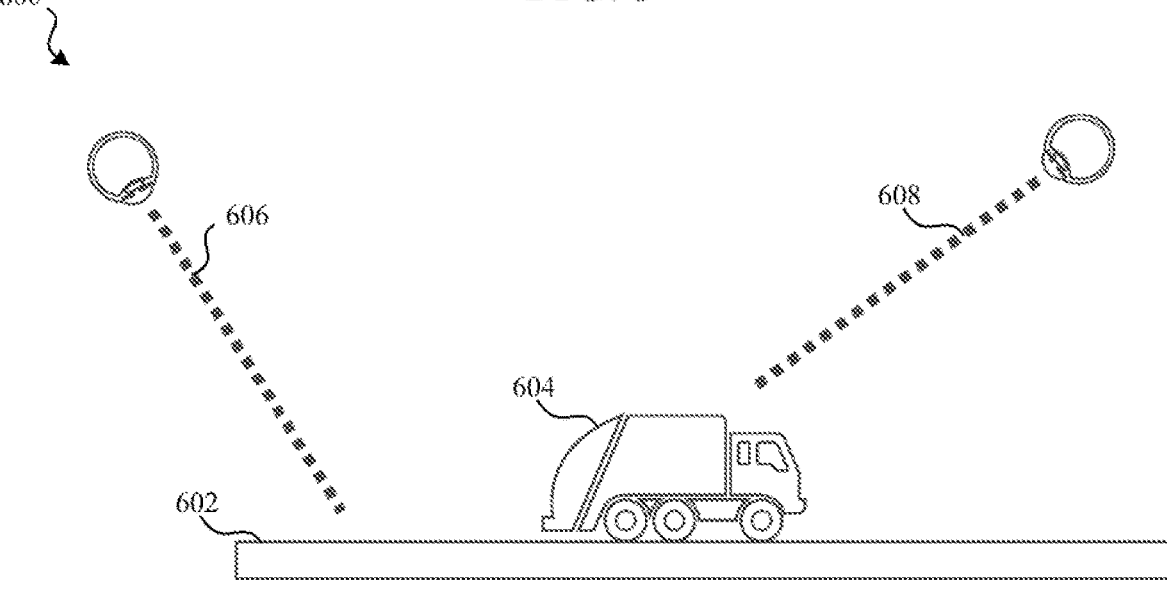
FIG. 6 is a block diagram illustrating directions of intent relative to multiple virtual objects.

FIG. 6 is a block diagram illustrating directions of intent relative to multiple virtual objects. In this example, the virtual objects include a scrollable map 602 and a tap-able unit 604. In this example, given a first direction of intent 606, the system may determine that an event should be associated with the scrollable map 602. Scrollable map 602 is the only object that is intersected by the first direction of intent 606. In this example, a second direction of intent 608 intersects both the scrollable map 602 and the tap-able unit 604. The system may apply one or more rules to associate an event with one or more appropriate virtual objects in such a circumstance. Such a rule may take into account whether the virtual objects are part of the same hierarchies or otherwise associated with one another, the types of the virtual objects (e.g., strong or weak), the interactions of the direction of intent with the virtual objects (e.g., which is closest, which entry point is closest, which exit point is closest, etc.), and/or the events handled by the virtual objects (e.g., which virtual object accepts/handles events of the type of the event). In one example, a tap event corresponding to the second direction of intent 608 is routed to the tap-able unit 604 based on determining that the entry into the tab-able unit 604 is closer than the entry into the scrollable map 602. In another example, a scroll event corresponding to the second direction of intent 608 is routed to the scrollable map 602 based on determining that even though the tab-able unit 604 is closer, the tap-able unit 604 does not accept/handle scroll events and the scrollable map 602 does accept/handle scroll events.

Figure 7:
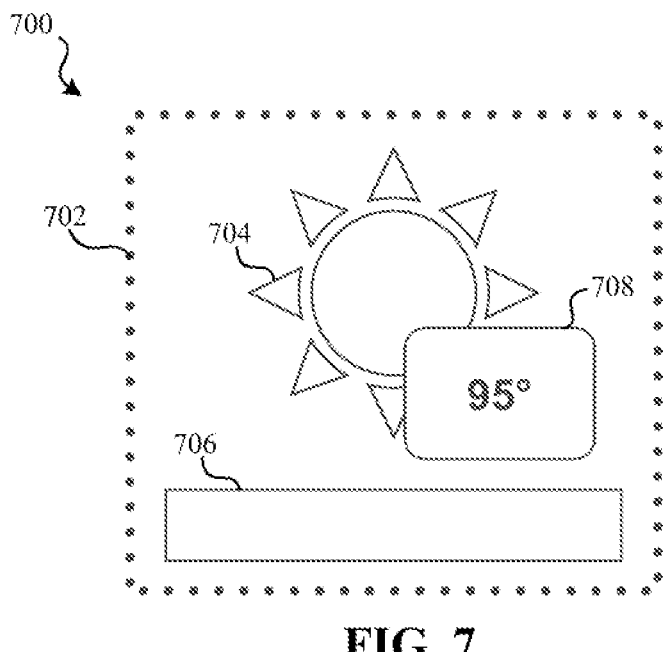
FIG. 7 is a block diagram illustrating a user interface of multiple virtual objects with respect to which interactions and other user events may be parented across.

FIG. 7 is a block diagram illustrating a user interface of multiple virtual objects with respect to which interactions and other user events may be parented across. In this example, the virtual objects include a container 702, a sun 704, a non-interactive base 706, and a label 708. In this example, events are parented according to rules that account for direction of intent, event type, object type, and parenting. Specifically, a tap event received while the direction of intent is on the sun 704 is directed to the sun. A tap event received while the direction of intent is on the label 708 is similarly directed to the label. The container 702 is configured as the parent of the sun 704, non-interactive base 706, and label 708. Accordingly, other events directed to these virtual objects are propagated to the container 702. A swipe up/down/left/right event, for example, received while a direction of intent is on the sun 704, non-interactive base 706, or label 708 is routed to the container 702.

Figure 8:
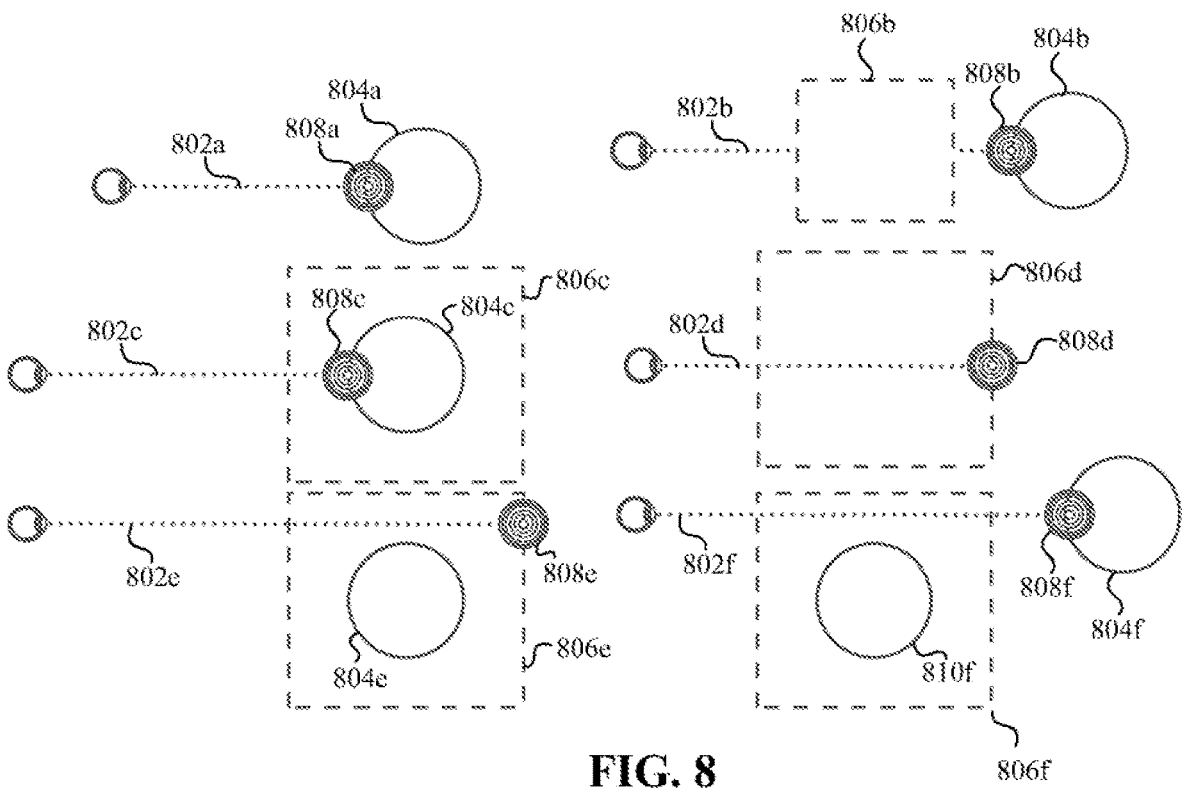
FIG. 8 is a block diagram illustrating an exemplary virtual object selection rule according to some implementations.

FIG. 8 is a block diagram illustrating an exemplary virtual object selection rule according to some implementations. The exemplary rule selects the virtual object with the nearest "strong" entry point along a ray cast in the direction of intent and, if no virtual objects do so, selects the virtual object with the nearest "weak" exit point along the ray cast in the direction of intent.

According to this rule, direction of intent 802a intersects the entry point of strong virtual object 804a first, so strong virtual object 804a is selected as illustrated by selector 808a.

According to this rule, direction of intent 802b intersects the entry point of strong virtual object 804b first, so strong virtual object 804b is selected as illustrated by selector 808b. Weak virtual object 806b is not selected even though the direction of intent 802b passes through it (entry and exit) prior to intersecting strong virtual object 804b.

According to this rule, direction of intent 802c intersects the entry point of strong virtual object 804c first, so strong virtual object 804c is selected as illustrated by selector 808c. Weak virtual object 806c is not selected even though the direction of intent passes into it (entry) prior to intersecting strong virtual object 804c.

According to this rule, direction of intent 802d does not intersect any strong virtual objects but does intersect the exit point of weak virtual object 806d, so weak virtual object 806d is selected as illustrated by selector 808d.

According to this rule, direction of intent 802e does not intersect any strong virtual objects but does intersect the exit point of weak virtual object 806e, so weak virtual object 806e is selected as illustrated by selector 808e.

According to this rule, direction of intent 802f intersects the entry point of strong virtual object 804f first, so strong virtual object 804f is selected as illustrated by selector 808f. Weak virtual object 806f is not selected even though the direction of intent 802f passes through it (entry and exit) prior to intersecting strong virtual object 804f. Strong virtual object 810f is not selected even though it is closer since it is not intersected by the direction of intent 802f.

Figure 9:
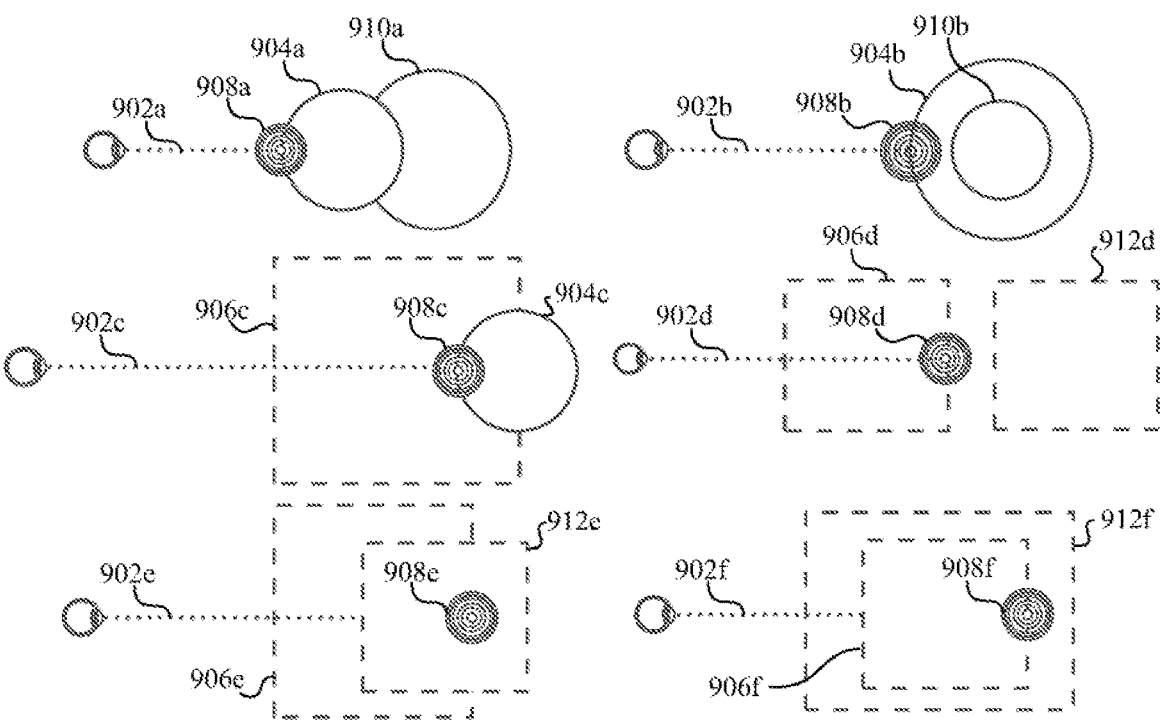
FIG. 9 is a block diagram illustrating the exemplary virtual object selection rule of FIG. 8 according to some implementations.

FIG. 9 is a block diagram illustrating an exemplary virtual object selection rule according to some implementations. The exemplary rule selects the virtual object with the nearest "strong" entry point along a ray cast in the direction of intent and, if no virtual objects do so, selects the virtual object with the nearest "weak" exit point along the ray cast in the direction of intent. This is the same exemplary rule as illustrated in FIG. 8.

According to this rule, direction of intent 902a intersects the entry point of strong virtual object 904a first, so strong virtual object 904a is selected as illustrated by selector 908a. Strong virtual object 910a is not selected since not intersected first by the direction of intent 902a.

According to this rule, direction of intent 902b intersects the entry point of strong virtual object 904b first, so strong virtual object 904b is selected as illustrated by selector 908b. Strong virtual object 910b is not selected since it is not intersected first by the direction of intent 902b.

According to this rule, direction of intent 902c intersects the entry point of strong virtual object 904c first, so strong virtual object 904c is selected as illustrated by selector 908c. Weak virtual object 906c is not selected even though the direction of intent passes into it (entry) prior to intersecting strong virtual object 904c.

According to this rule, direction of intent 902d does not intersect any strong virtual objects but does intersect the exit point of weak virtual object 906d, so weak virtual object 906d is selected as illustrated by selector 908d. Weak virtual object 912d is not selected since its exit point is not intersected first by the direction of intent 902d.

According to this rule, direction of intent 902e does not intersect any strong virtual objects but does intersect the exit point of weak virtual object 906e, so weak virtual object 906e is selected as illustrated by selector 908e. Weak virtual object 912e is not selected since its exit point is not intersected first by the direction of intent 902e.

According to this rule, direction of intent 902f does not intersect any strong virtual objects but does intersect the exit point of weak virtual object 906f, so weak virtual object 906f is selected as illustrated by selector 908f. Weak virtual object 912f is not selected since its exit point is not intersected first by the direction of intent 902f.

Figure 10:
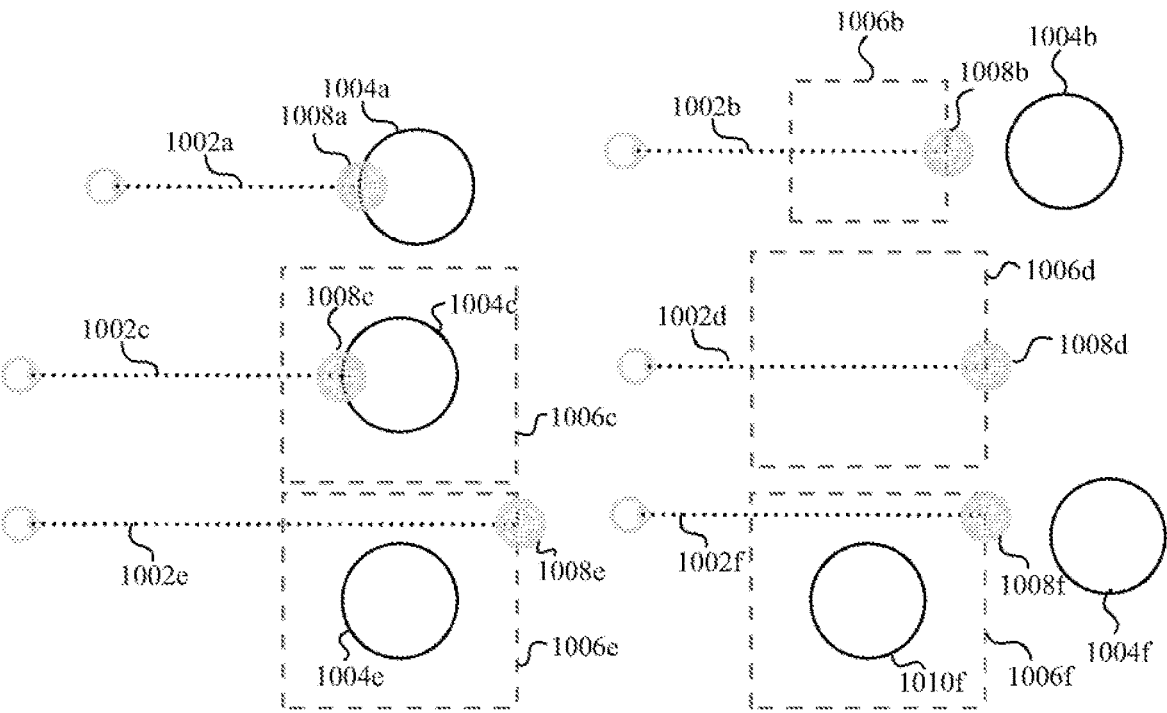
FIG. 10 is a block diagram illustrating another exemplary virtual object selection rule according to some implementations.

FIG. 10 is a block diagram illustrating another exemplary virtual object selection rule according to some implementations. In contrast to the rule illustrated in FIGS. 8-9 (which selects the virtual object with the nearest "strong" entry point along a ray cast in the direction of intent and, if no virtual objects do so, selects the virtual object with the nearest "weak" exit point along the ray cast in the direction of intent), the exemplary rule illustrated in FIG. 10 selects the virtual object with the nearest "strong" entry point or "weak" exit point, whichever comes first along a ray cast in the direction of intent.

According to this rule, direction of intent 1002a intersects the entry point of strong virtual object 1004a first, so strong virtual object 1004a is selected as illustrated by selector 1008a. The rule illustrated in FIG. 8 would have yielded the same result.

According to this rule, direction of intent 1002b intersects the exit point of weak virtual object 1006b before it intersects the entry point of strong virtual object 1004b first, so weak virtual object 1006b is selected as illustrated by selector 1008b. In comparison, the rule illustrate in FIG. 8 would have resulted in strong virtual object 1004b having been selected.

According to this rule, direction of intent 1002c intersects the entry point of strong virtual object 1004c first, so strong virtual object 1004c is selected as illustrated by selector 1008c. Weak virtual object 1006c is not selected even though the direction of intent passes into it (entry) prior to intersecting strong virtual object 1004c. The rule illustrated in FIG. 8 would have yielded the same result.

According to this rule, direction of intent 1002d does not intersect any strong virtual objects but does intersect the exit point of weak virtual object 1006d, so weak virtual object 1006d is selected as illustrated by selector 1008d. The rule illustrated in FIG. 8 would have yielded the same result.

According to this rule, direction of intent 1002e does not intersect any strong virtual objects but does intersect the exit point of weak virtual object 1006e, so weak virtual object 1006e is selected as illustrated by selector 1008e. The rule illustrated in FIG. 8 would have yielded the same result.

According to this rule, direction of intent 1002f intersects the exit point of weak virtual object 1006f before it intersects the entry point of strong virtual object 1004f, so weak virtual object 1006f is selected as illustrated by selector 1008f. Strong virtual object 1010f is not selected even though it is closer since it is not intersected by the direction of intent 1002f. In comparison, the rule illustrate in FIG. 8 would have resulted in strong virtual object 1004f having been selected.

Figure 11:
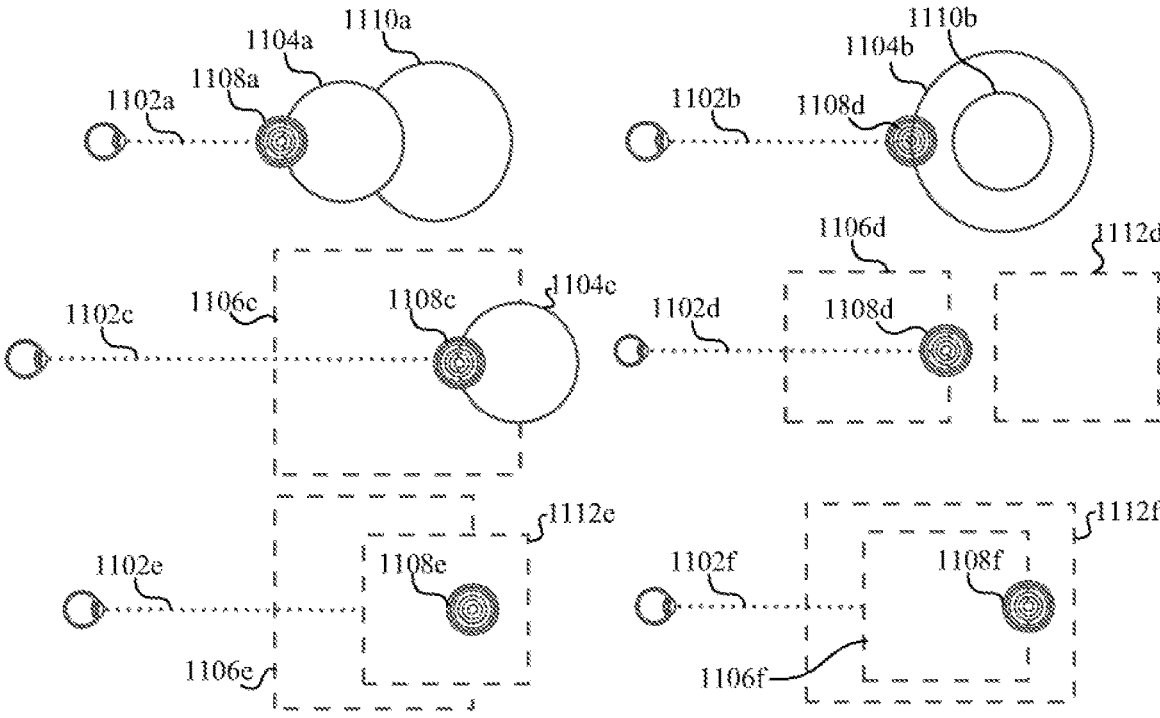
FIG. 11 is a block diagram illustrating the exemplary virtual object selection rule of FIG. 10 according to some implementations.

FIG. 11 is a block diagram illustrating an exemplary virtual object selection rule in accordance with some implementations. The exemplary rule selects the virtual object with the nearest "strong" entry point or "weak" exit point, whichever comes first along a ray cast in the direction of intent. This is the same exemplary rule as illustrated in FIG. 10.

According to this rule, direction of intent 1102a intersects the entry point of strong virtual object 1104a first, so strong virtual object 1104a is selected as illustrated by selector 1108a. Strong virtual object 1110a is not selected since it is not intersected first by the direction of intent 1102a. The rule illustrated in FIG. 8 would have yielded the same result.

According to this rule, direction of intent 1102b intersects the entry point of strong virtual object 1104b first, so strong virtual object 904b is selected as illustrated by selector 1108b. Strong virtual object 1110b is not selected since it is not intersected first by the direction of intent 1102b. The rule illustrated in FIG. 8 would have yielded the same result.

According to this rule, direction of intent 1102c intersects the entry point of strong virtual object 1104c first, so strong virtual object 1104c is selected as illustrated by selector 1108c. Weak virtual object 1106c is not selected even though the direction of intent passes into it (entry) prior to intersecting strong virtual object 1104c. The rule illustrated in FIG. 8 would have yielded the same result.

According to this rule, direction of intent 1102d does not intersect any strong virtual objects but does intersect the exit point of weak virtual object 1106d, so weak virtual object 1106d is selected as illustrated by selector 1108d. Weak virtual object 1112d is not selected since its exit point is not intersected first by the direction of intent 1102d. The rule illustrated in FIG. 8 would have yielded the same result.

According to this rule, direction of intent 1102e does not intersect any strong virtual objects but does intersect the exit point of weak virtual object 1106e, so weak virtual object 1106e is selected as illustrated by selector 1108e. Weak virtual object 1112e is not selected since its exit point is not intersected first by the direction of intent 1102e. The rule illustrated in FIG. 8 would have yielded the same result.

According to this rule, direction of intent 1102f does not intersect any strong virtual objects but does intersect the exit point of weak virtual object 1106f, so weak virtual object 1106f is selected as illustrated by selector 1108f. Weak virtual object 1112f is not selected since its exit point is not intersected first by the direction of intent 1102f. The rule illustrated in FIG. 8 would have yielded the same result.

Figure 12:
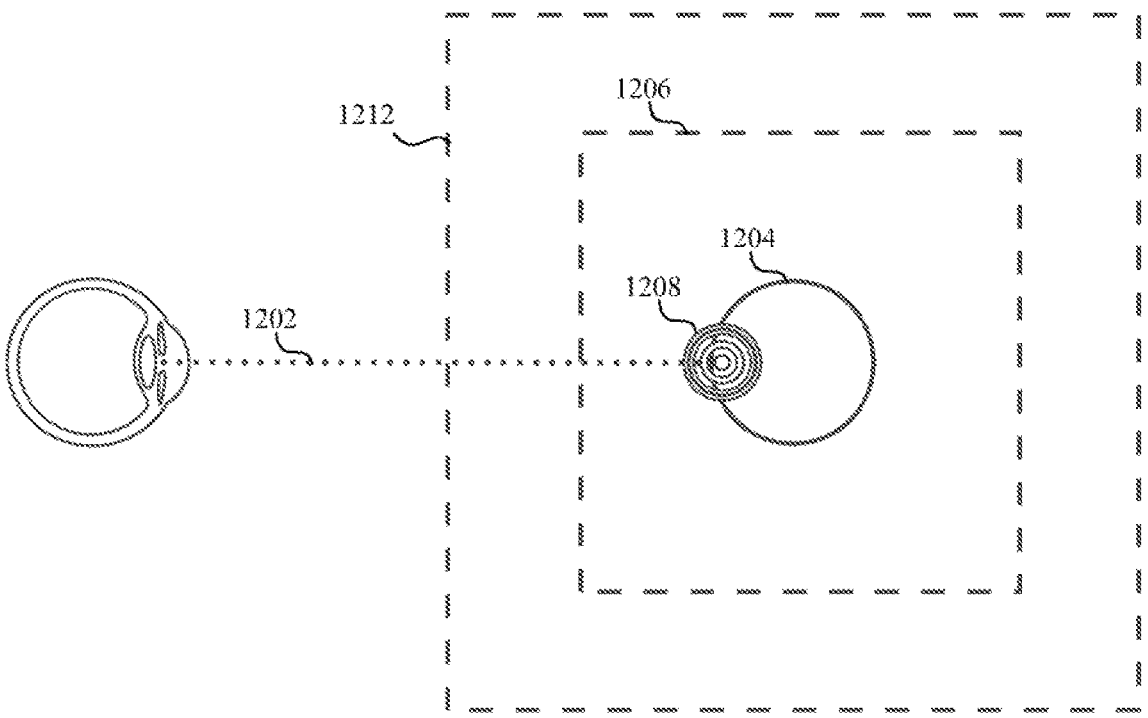
FIG. 12 is a block diagram illustrating exemplary event propagation according to some implementations.

FIG. 12 is a block diagram illustrating exemplary event propagation according to some implementations. In this example, the three virtual objects 1204, 1206, 1208 are associated by a hierarchical arrangement. Virtual object 1206 is the parent of virtual object 1204. Virtual object 1212 is the parent of virtual object 1206 and the grandparent of virtual object 1204. In this example, according to a selection rule (such as one of the rules illustrates in FIGS. 8-11), an event is associated with virtual object 1204. Specifically, the event is associated with virtual object 1204 based on the direction of intent 1202 intersecting the virtual object 1204, which is a strong virtual object in this example, as indicated by selector 1208.

In this example, the interaction with virtual object 1204 may be propagated according to the hierarchical associations between the virtual objects 1204, 1206, 1212 and the circumstances of the interaction. For example, in some circumstances, e.g., a tap event, the interaction may be associated with the virtual object 1204. In other circumstances, e.g., a scroll event, the interaction may be propagated to the virtual object 1206. In other circumstances, e.g., a close command, the interaction may be propagated to the virtual object 1212.

In some implementations, a virtual object is configured to inhibit or prevent the downward propagation of events e.g., preventing the downward propagation of certain types of events. For example, a container object may determine to prevent the delivery of certain events (e.g., swipes) to is child objects, but allow the delivery of some other events.

Figure 13:
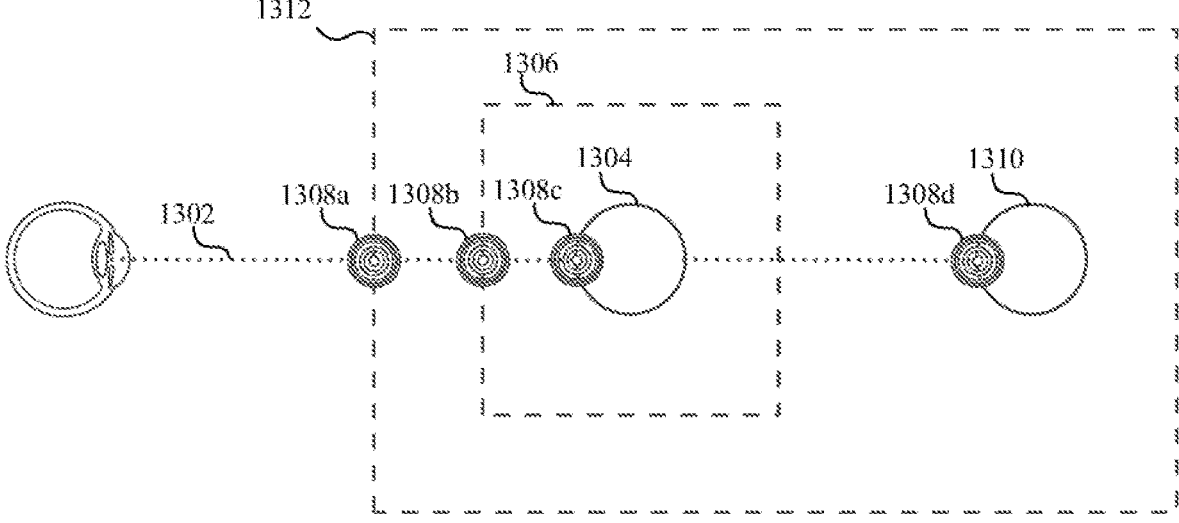
FIG. 13 is a block diagram illustrating multiple hit-test targets in accordance with some implementations.

FIG. 13 is a block diagram illustrating multiple hit-test targets in accordance with some implementations. In this example, the 3D graphical environment includes four virtual objects 1304, 1306, 1310, 1312. In this example, according to a multiple-interaction test rule each of the virtual objects 1304, 1306, 1310, 1312 is selected as a target. In certain circumstances, events may be routed to multiple targets according to a multi-target selection rule, e.g., that selects all virtual objects along a direction of intent or that selects all virtual objects associated via an association such as a hierarchical arrangement with any object along the direction of intent. In some implementations, an event may be associated with multiple virtual objects based on identifying uncertainty, e.g., where a gaze direction is uncertain.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
    at a processor:
        determining a direction of intent in a three dimensional (3D) graphical environment, the direction of intent associated with a user event;
        determining one or more intersections of the direction of intent with one or more virtual objects in the 3D graphical environment, wherein determining the one or more intersections comprises:
            identifying one or more entering intersections with one or more objects of a first type; and
            identifying one or more exiting intersections with one or more objects of a second type; and
        generating an interaction associating the event with a virtual object of the one or more virtual objects, wherein the virtual object is selected based on a rule that accounts for proximity and virtual object type, wherein the virtual object is selected based on selecting the virtual object based on identifying a nearest intersection of the one or more entering intersections with the one or more objects of the first type and the one or more exiting intersections with the one or more objects of the second type.

2. The method of claim 1, wherein the direction of intent is determined based on a gaze direction, finger direction, or hand-held device orientation.

3. The method of claim 1, wherein the direction of intent is determined based on detecting a direction during a previous time period.

4. The method of claim 1, wherein the one or more intersections are determined based on a line segment determined based on the direction of intention and a convergence of gaze directions.

5. The method of claim 1, wherein the event is triggered by detecting a spoken word, a hand gesture, or input received via an input device.

6. The method of claim 1, wherein the virtual object is selected using a rule, wherein, if an entry point into the first type of virtual object is intersected, the rule selects the virtual object based on the nearest intersection of the one or more intersections that enters the first type of virtual object.

7. The method of claim 6, wherein, if no entry points into the first type of virtual object are intersected, the rule selects the virtual object based on the nearest intersection of the one or more intersections that exits the second type of virtual object.

8. The method of claim 1, wherein the virtual object is selected using a rule, wherein the rule selects the nearest entry point into the first type of virtual object or exit point from the second type of virtual object along a ray or cone cast in the direction of intention.

9. The method of claim 1 further comprising propagating the event based on the interaction associating the event with the virtual object, wherein the propagating comprises:
    determining a relationship between the virtual object and a second virtual object based on an object hierarchy; and
    based on the relationship, propagating the event to the second virtual object.

10. The method of claim 1 further comprising propagating the event based on associating the interaction associating the event with the virtual object, wherein the propagating comprises:
    determining a context in the 3D graphical environment at a time of the event; and
    based on the context, propagating the event to the second virtual object.

11. The method of claim 1 further comprising propagating the event based on associating the interaction associating the event with the virtual object, wherein the propagating comprises:
    determining a type of the event; and
    based on the type of the event, propagating the event to the second virtual object.

12. The method of claim 1, wherein generating the interaction associates the event with multiple virtual objects of the one or more virtual objects based on identifying uncertainty.

13. The method of claim 1, wherein generating the interaction comprises:
    determining that an event could be associated with the virtual object or a second virtual object;
    determining that the event is associated with a type; and
    associating the event with the virtual object based on the virtual object utilizing input of the type and the second object not utilizing input of the type.

14. The method of claim 1, wherein the virtual object type of one or more virtual objects accounted for by the rule identifies whether virtual objects are weak or strong.

15. The method of claim 1, wherein the virtual object type of one or more virtual objects accounted for by the rule identifies whether virtual objects are invisible.

16. The method of claim 1, wherein the virtual object type of one or more virtual objects accounted for by the rule identifies whether virtual objects are opaque.

17. The method of claim 1, wherein the virtual object type of one or more virtual objects accounted for by the rule identifies whether virtual objects are containers.

18. A device comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

determining a direction of intent in a three dimensional (3D) graphical environment, the direction of intent associated with a user event;

determining one or more intersections of the direction of intent with one or more virtual objects in the 3D graphical environment, wherein determining the one or more intersections comprises:

identifying one or more entering intersections with one or more objects of a first type; and identifying one or more exiting intersections with one or more objects of a second type; and generating an interaction associating the event with a virtual object of the one or more virtual objects, wherein the virtual object is selected based on a rule that accounts for proximity and virtual object type, wherein the virtual object is selected based on selecting the virtual object based on identifying a nearest intersection of the one or more entering intersections with the one or more objects of the first type and the one or more exiting intersections with the one or more objects of the second type.

19. The device of claim 18, wherein the virtual object is selected using a rule, wherein, if an entry point into the first type of virtual object is intersected, the rule selects the virtual object based on the nearest intersection of the one or more intersections that enters the first type of virtual object.

20. The device of claim 18, wherein, if no entry points into the first type of virtual object are intersected, the rule selects the virtual object based on the nearest intersection of the one or more intersections that exits the second type of virtual object.

21. The device of claim 18, wherein the virtual object is selected using a rule, wherein the rule selects the nearest entry point into the first type of virtual object or exit point from the second type of virtual object along a ray or cone cast in the direction of intention.

22. A non-transitory computer-readable storage medium, storing program instructions executable on an electronic device to perform operations comprising:

determining a direction of intent in a three dimensional (3D) graphical environment, the direction of intent associated with a user event;

determining one or more intersections of the direction of intent with one or more virtual objects in the 3D graphical environment, wherein determining the one or more intersections comprises:

identifying one or more entering intersections with one or more objects of a first type; and identifying one or more exiting intersections with one or more objects of a second type; and generating an interaction associating the event with a virtual object of the one or more virtual objects, wherein the virtual object is selected based on a rule that accounts for proximity and virtual object type, wherein the virtual object is selected based on selecting the virtual object based on identifying a nearest intersection of the one or more entering intersections with the one or more objects of the first type and the one or more exiting intersections with the one or more objects of the second type.

23. The non-transitory computer-readable storage medium of claim 22, wherein the virtual object is selected using a rule, wherein, if an entry point into the first type of virtual object is intersected, the rule selects the virtual object based on the nearest intersection of the one or more intersections that enters the first type of virtual object.

24. The non-transitory computer-readable storage medium of claim 22, wherein, if no entry points into the first type of virtual object are intersected, the rule selects the virtual object based on the nearest intersection of the one or more intersections that exits the second type of virtual object.

* * * * *